US009270113B2

(12) United States Patent
Bellis

(10) Patent No.: US 9,270,113 B2
(45) Date of Patent: Feb. 23, 2016

(54) POWER DISTRIBUTION CABINET

(75) Inventor: Andrew D. Bellis, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 812 days.

(21) Appl. No.: 13/595,288

(22) Filed: Aug. 27, 2012

(65) Prior Publication Data
US 2014/0054957 A1    Feb. 27, 2014

(51) Int. Cl.
*H02J 1/10*    (2006.01)
(52) U.S. Cl.
CPC ........................ *H02J 1/108* (2013.01)
(58) Field of Classification Search
CPC ........................................ H02J 1/108
USPC .......................................... 307/29
See application file for complete search history.

(56) References Cited

U.S. PATENT DOCUMENTS

| | | | |
|---|---|---|---|
| 6,600,963 B1* | 7/2003 | Loise et al. | 700/81 |
| 2007/0268726 A1* | 11/2007 | Kojori et al. | 363/65 |
| 2009/0315393 A1* | 12/2009 | Yeh | 307/10.1 |
| 2010/0080027 A1* | 4/2010 | Wiegman et al. | 363/126 |
| 2010/0222936 A1* | 9/2010 | Helfrick et al. | 700/292 |

* cited by examiner

*Primary Examiner* — Jared Fureman
*Assistant Examiner* — Duc M Pham
(74) *Attorney, Agent, or Firm* — Kinney & Lange, P.A.

(57) ABSTRACT

A power supply module included in a power distribution cabinet distributes power from one or more power sources to a plurality of internal cabinet modules. The power supply module includes a plurality of input terminals, each input terminal connected to a different power source, wherein availability of each of the plurality of power sources varies during operation of the aircraft or vehicle. A plurality of output terminals connected to one or more of the plurality of input terminals to provide an output that represents a combination of selected power sources.

15 Claims, 3 Drawing Sheets

POWER DISTRIBUTION CABINET

BACKGROUND

The present invention is related to an electrical power distribution cabinet and in particular to a multi-source power distribution cabinet.

Power distribution cabinets are commonly in aircraft applications to house modules used to distribute power to various electrical loads. However, the availability needs for these various electrical loads may not be the same. For example, some electrical loads only need to be controlled and powered by the distribution cabinet in selected aircraft operational modes, such as only when the aircraft is on ground, or when the aircraft is being refueled, or only when certain combinations of aircraft electrical buses and sources are available.

A typical power distribution cabinet allows various input power sources to be OR'd together for distribution to one or more internal cabinet modules, with each source being connected to the power supply module at a single connection point, rather than to each internal cabinet module individually. In addition, the power supply module typically provides hold-up power to each of the internal cabinet modules during transient events.

SUMMARY

A power supply module included in a power distribution cabinet distributes power from one or more external power sources to a plurality of internal cabinet modules. The power supply module includes a plurality of input terminals, each input terminal connected to a different vehicle power source, wherein availability of each of the plurality of power sources varies during operation of the vehicle. The power supply module includes a plurality of output terminals connected to one or more of the input terminals to provide an output that represents a combination of selected power sources.

DETAILED DESCRIPTION

Figure 1:
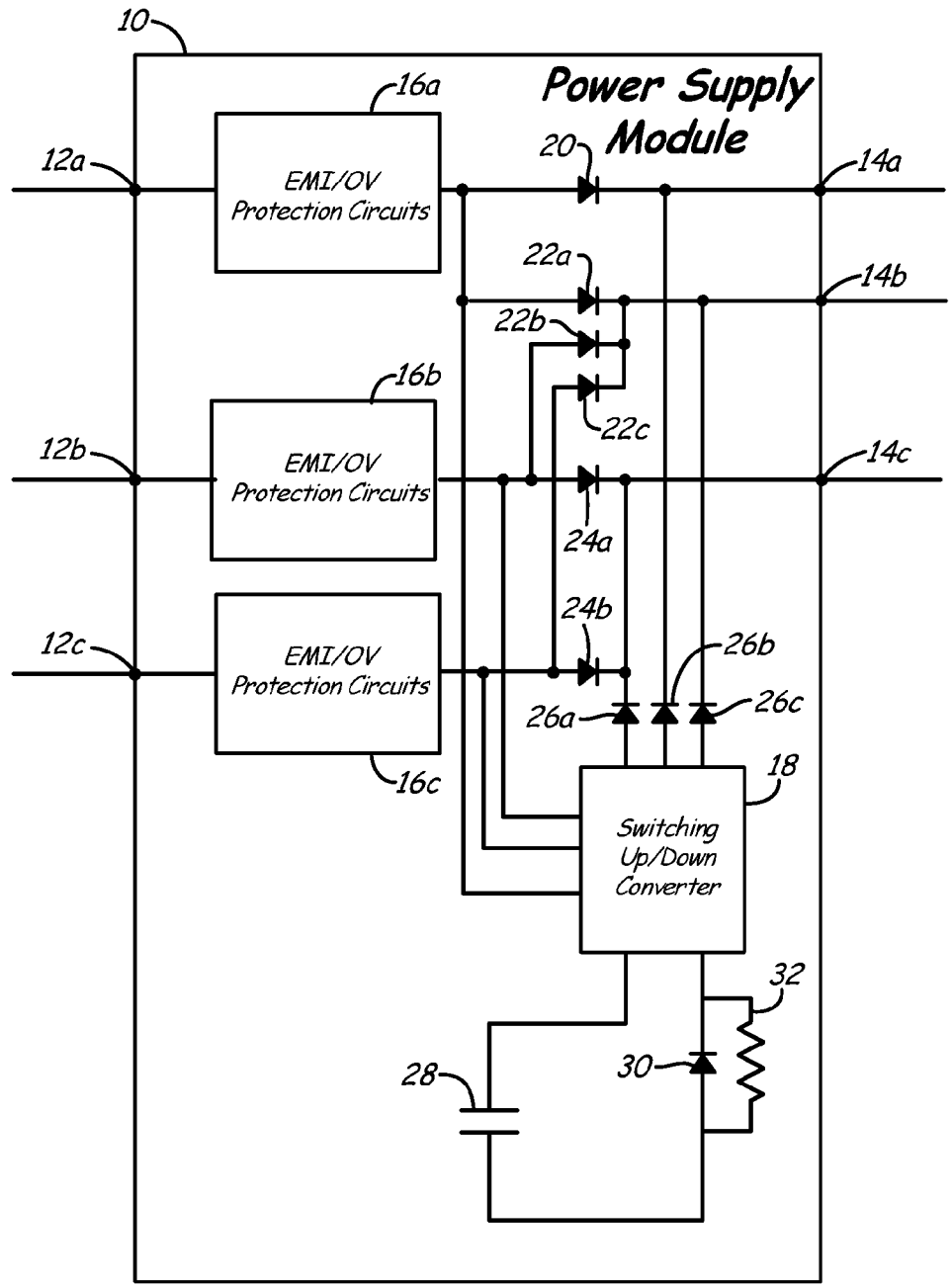
FIG. 1 is a circuit diagram of a power supply module employed in a power distribution cabinet according to an embodiment of the present invention.

FIG. 1 is a circuit diagram of power supply module employed in a power distribution cabinet according to an embodiment of the present invention. Power supply module 10 includes a plurality of inputs 12a, 12b, and 12c, a plurality of outputs 14a, 14b, and 14c, electromagnetic interference/overvoltage protection (EMI/OV) circuits 16a, 16b, and 16c, switching up/down converter 18, diode 20, a first plurality of OR'd diodes 22a, 22b, and 22c, a second plurality of OR'd diodes 24a and 24b, and a third plurality of diodes 26a, 26b, and 26c, high voltage capacitor 28, diode 30, and resistor 32.

Each of the plurality of inputs 12a, 12b, and 12c are connected to a different external aircraft DC power source. Depending on the operational stage of the aircraft (e.g., on the ground, in-flight, etc.) one or more of the DC power sources may not be available. In one embodiment, input terminal 12a receives power from an aircraft maintenance DC power bus that is powered when the aircraft is on the ground. Input terminal 12b is powered by an aircraft main DC bus that is powered during all modes of operation, and input terminal 12c is powered by a permanent magnet generator (PMG) derived DC power bus, which is powered only when the aircraft engine is running. In this example, input 12c would likely be unpowered when the aircraft is on the ground and the engine is not running.

The plurality of outputs 14a, 14b, and 14c are connected to one or more of the plurality of inputs to receive power from at least one of the DC power sources. For example, output 14a is connected to receive power from the DC input providing power to input terminal 12a. In this embodiment, input terminal 12a is connected to a maintenance bus that is only available when the aircraft is on the ground. Therefore, only those cabinet modules that are required to be functional during maintenance operations when the aircraft is on the ground are connected to output terminal 14a. Similarly, output terminal 14b is connected to receive power from either input terminal 12a, 12b, or 12c, such that output terminal 14b remains powered during all modes of aircraft operation. Cabinet modules that need to be powered and functional during all modes of aircraft operation are connected to output terminal 14b. Finally, output terminal 14c is connected to receive power from either input terminal 12b or 12c (e.g., main bus power or PMG power), and is provided to power cabinet modules that are required to be operational during engine operation or when the main DC bus power is available.

The connection of output terminals 14a, 14b, and 14c to one or more input terminals 12a, 12b, and 12c allows specific classes of internal cabinet power supplies for the modules to be made available for connection to selected modules and types of modules, which in turn, can support vehicle distribution functions and loads in a selective module by module manner based on aircraft operational mode. In this way, the present invention provides an architecture that provides selective availability of powering the internal cabinet modules. This selective availability of modules is not dependent on any internal cabinet supervisory control or monitoring function, but is determined solely by the combination of external input terminal connected feeds and the ORing function of Power Supply module. As an example this architecture can be used to give a high integrity, yet flexible and cost optimized aircraft distribution cabinet design architecture.

In the embodiment shown in FIG. 1, power supply module 10 includes electromagnetic interference/overvoltage (EMI/OV) protection circuits 16a, 16b, and 16c connected to input terminals 12a, 12b, and 12c, respectively. Each EMI/OV protection circuit 16a, 16b, and 16c provides filtering of power received from the respective external DC power source, and also provides overvoltage protection for each input that may include aircraft lightning strike protection. Each EMI/OV protection circuit 16a, 16b, and 16c can also provide over current protection and initial in-rush current control functions. The over current protection ensures that under distribution cabinet internal failure cases, the maximum current drawn from each input terminal (12a, 12b, and 12c) is limited to a safe maximum. Similarly the in-rush current control function ensures that the initial surge of current draw during normal distribution cabinet power-up operation is controlled/limited from each input terminal (12a, 12b, and 12c).

In addition, power module 10 includes switching up/down converter 18 that receives input from each of the plurality of input terminals 12a, 12b, and 12c, and utilizes the received power to charge high voltage storage capacitor 28. In this way, switching up/down converter 18 remains powered despite a loss of power at one or more (but not all) input terminals 12a, 12b, and 12c. In one embodiment, switching up/down converter 18 includes a DC-DC step-up for converter for increasing the voltage supplied by one or more of the input terminals 12a, 12b, and 12c to a higher voltage for storage across high voltage storage capacitor 28. Switching up/down converter 18 may utilize a DC-DC converter to step down the voltage provided by high voltage storage capacitor 28 to a lower voltage suitable for supply to loads connected to output terminals 14a, 14b, and 14c. In response to a loss of power with respect to one or more of power sources, and therefore a loss of power at one or more of the output terminals 14a, 14b, and 14c, switching up/down converter 18 utilizes energy stored in high voltage storage capacitor 28 to maintain power to the one or more output terminals for a short period of time. This allows the loads connected to the one or more outputs 14a, 14b, and 14c to remain powered during transient loss of power conditions in the one or more of the external power sources.

In the embodiment shown in FIG. 1, diode OR circuits are utilized for those output terminals connected to one or more input terminals to prevent independent power sources from being shorted to one another. For example, output terminal 14b is connected to each of the plurality of input terminals 12a, 12b, and 12c via diodes 22a, 22b, and 22c, respectively, which form a diode OR'd power circuit. Similarly, output terminal 14c is connected to receive power from input terminals 12b and 12c via diodes 24a and 24b, respectively, which form another diode OR'd power circuit. In addition, the power supplied by switching up/down converter 18 is supplied to each output terminal 14a, 14b, and 14c via diodes 26a, 26b, and 26c, respectively.

In this way, power supply module receives power from a plurality of inputs, and selectively distributes the power received from the plurality of inputs to one or more outputs. In one embodiment, two or more power supply modules may be utilized in each power distribution cabinet to provide additional redundancy.

Figure 2:
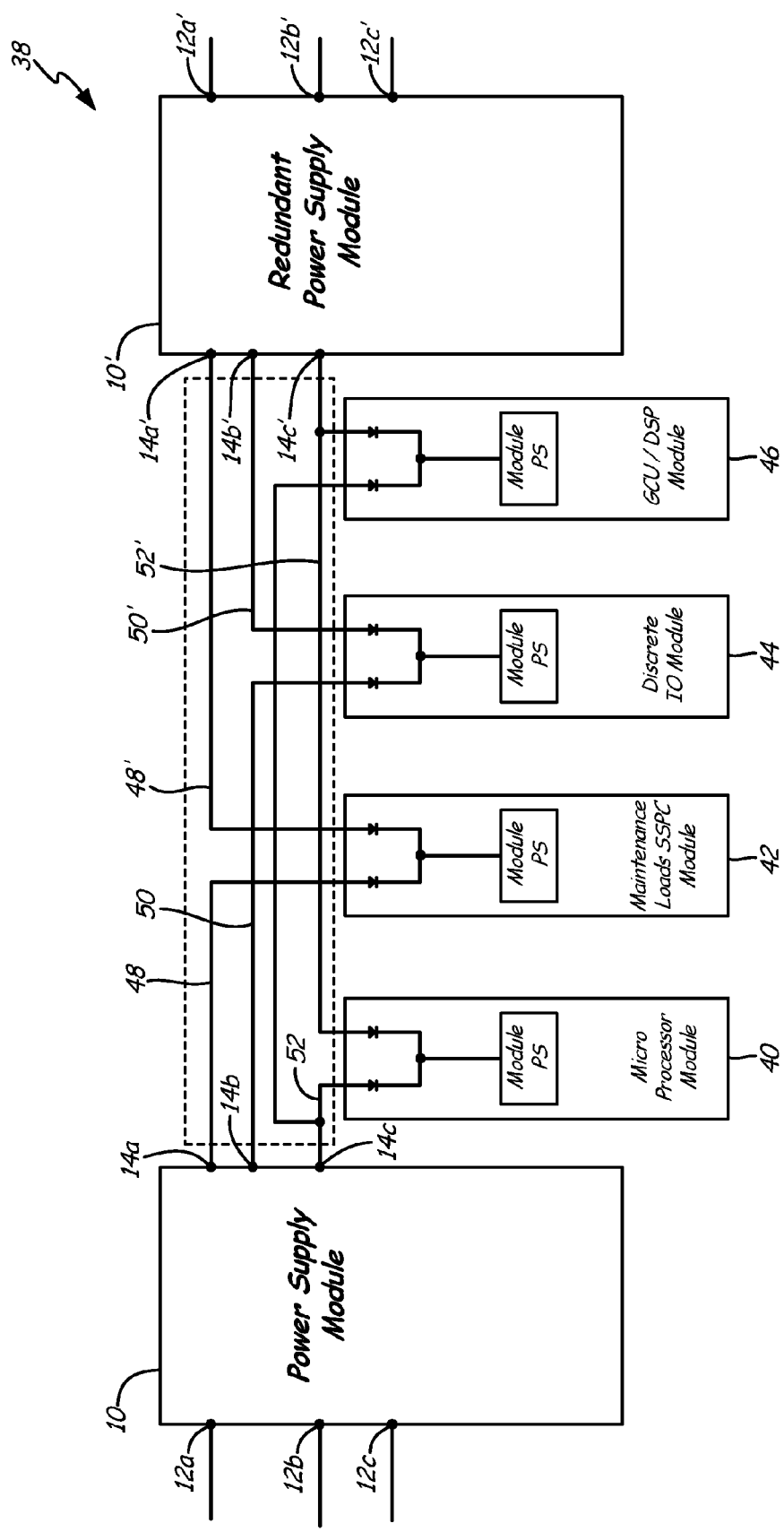
FIG. 2 is a circuit diagram of a power distribution cabinet according to an embodiment of the present invention.

FIG. 2 is a circuit diagram of power distribution cabinet 38 according to an embodiment of the present invention. In this embodiment, power distribution cabinet 38 includes redundant power supply modules 10 and 10', microprocessor module 40, maintenance loads module 42, discrete input/output (IO) module 44, generator control unit/digital signal processor (GCU/DSP) module 46, and backplane internal module power feed buses including first backplane power buses 48 and 48', second backplane power buses 50 and 50', and third backplane power buses 52 and 52'. Microprocessor module 40, maintenance loads module 42, discrete input/output (IO) module 44, and generator control unit/digital signal processor (GCU/DSP) module 46 are referred to collectively as "internal cabinet modules".

Power supply module 10 represents the same power supply module described in detail with respect to FIG. 1. Power supply module 10' is redundant to power supply module 10, and is implemented in the same manner as power supply module 10. For example, power supply module 10' includes input terminals 12a', 12b', and 12c', and output terminals 14a', 14b', and 14c'. Input terminals 12a', 12b', and 12c' are connected to the same power sources as input terminals 12a, 12b, and 12c, respectively. In other embodiments though, power supply module 10' may be connected to one or more power sources that vary from the power sources connected to power supply module 10.

As described with respect to FIG. 1, input terminals 12a and 12a' are connected to a maintenance bus that is available when the aircraft is on the ground. Input terminals 12b and 12b' are connected to the aircraft main DC bus that is available during all modes of operation. Input terminals 12c and 12c' are connected to a PMG derived DC power bus that is available only when the aircraft engines are running. Output terminals 14a and 14a' are connected to receive power only from the maintenance bus via input terminals 12a and 12a', respectively. Output terminals 14b and 14b' are connected to receive power from any of the available power sources via input terminals 12a, 12a', 12b, 12b', 12c, and 12c' (e.g., maintenance bus, main power bus, and/or PMG bus). Output terminals 14c and 14c' are connected to receive power from input terminals 12b, 12b' and 12c, 12c' (e.g., main power or PMG power). First backplane power buses 48 and 48' are connected to output terminals 14a and 14a'. Second backplane power buses 50 and 50' are connected to output terminals 14b and 14b'. Third backplane power buses 52 and 52' are connected to output terminals 14c and 14c'. As a result, first backplane power buses 48 and 48' are available only when the maintenance bus is available. Second backplane power buses 50 and 50' are available when any of the three input buses (maintenance bus, main bus, and/or PMG bus) are available. Third backplane power buses 52 and 52' are available only when main power bus or PMG bus is available.

Internal cabinet modules 40, 42, 44, and 46 perform a variety of functions, some of which are only required during specific modes of aircraft operation (e.g., when engines are running, etc.). Power distribution cabinet 38 connects each module to one of the backplane power buses depending on the operational availability of power required by the module. For example, maintenance module 42 supports distribution load functions that only are required during aircraft maintenance operations. Therefore, maintenance module 42 is connected to backplane power bus 48 provided by power supply module 10 and backplane power bus 48' provided by power supply module 10'. Likewise, microprocessor module 40 and GCU/DSP module 46 together support distribution cabinet and generator control functions which are needed to operate during main DC bus power and/or when the engine is operational. Therefore, these modules are connected to backplane power bus 14c provided by power supply module 10 and backplane power bus 14c' provided by power supply module 10'. Discrete I/O module 44 supports functions which are needed during all modes of operation. Therefore, discrete I/O module 44 is connected to backplane power bus 14b provided by power supply module 10 and backplane power bus 14b' provided by power supply module 10'.

Figure 3:
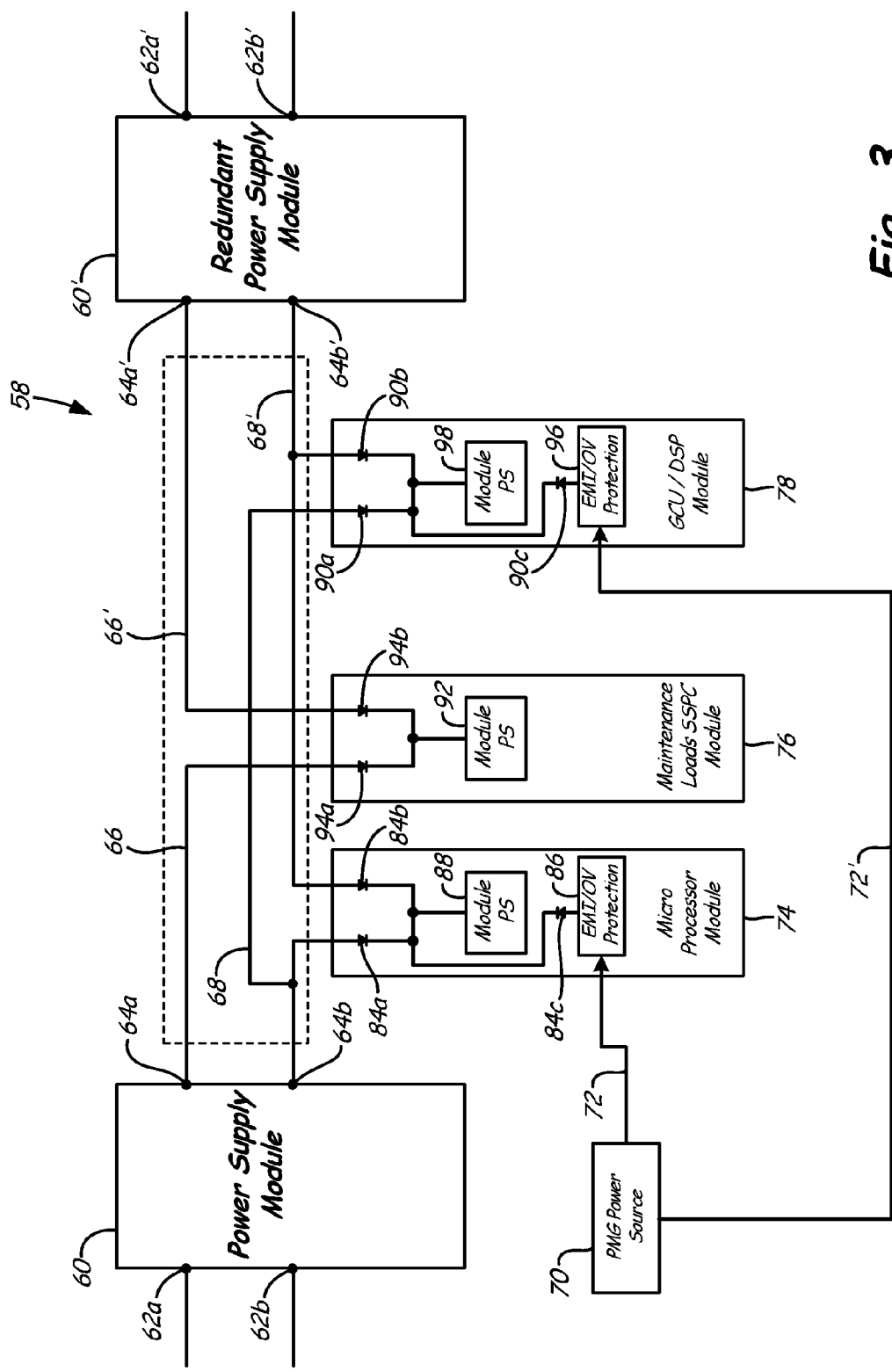
FIG. 3 is a circuit diagram of a power distribution cabinet according to another embodiment of the present invention.

FIG. 3 is a circuit diagram of power distribution cabinet 58 according to another embodiment of the present invention. In the embodiment shown in FIG. 3, power distribution cabinet 58 includes power supply modules 60 and 60'. Once again, power supply module 60' is redundant to power supply module 60. For purposes of this description, operations are described only with respect to power supply module 60, but it is understood that similar operations can be performed by redundant power supply module 60'.

In contrast with the embodiment shown with respect to FIGS. 1 and 2, power supply module 60 (and redundant power supply module 60') only includes input terminals 62a and 62b, and output terminals 64a and 64b. Backplane power bus 66 distributes power from output terminal 64a, while backplane power bus 68 distributes power from output terminal 64b. In the embodiment shown in FIG. 3, output terminal 64a is connected to receive power only from the power source connected to input terminal 62a, and output terminal 64b is connected to receive power only from the power source connected to input terminal 62b. Input terminal 62a is connected to a maintenance power bus, while input terminal 62b is connected to a main power bus, with no input terminal connected to a permanent magnet generator (PMG) power source. Rather, PMG power source 70 is connected to power distribution cabinet 58 via an external feed 72 (and 72').

In the embodiment shown in FIG. 3, microprocessor module 74 and GCU/DSP module 78 are connected to receive power from backplane power bus 68, while maintenance module 76 is connected to receive power from backplane power bus 66. Each module includes diodes to provide diode OR'ing of the redundant backplane power buses. For example, diodes 84a and 84b provide a diode OR circuit with respect to backplane power bus 68 provided by power supply module 60 and backplane power bus 68' provided by power supply module 60'.

In addition, microprocessor module 74 and GCU/DSP module 78 are connected to receive power from PMG power source 70 via external feeds 72 and 72'. With respect to microprocessor module 74, power provided by external feeder 72 is supplied to EMI/OV protection circuit 86 located locally on microprocessor module 74. The output of EMI/OV protection circuit 86 is diode OR'd (via diode 84c) with power received from backplane power buses 68 and 68' for provision to module power supply 88. In this way, microprocessor module 74 is powered either by the main power bus (provided at input terminals 62b and 62b' of power supply modules 60 and 60', respectively) or via power provided by PMG power source 70.

Similarly, GCU/DSP module 78 is connected to receive power from PMG power source 70 via feeder line 72'. GCU/DSP module 78 includes EMI/OV protection circuit 96, module power supply 98, and diodes 90a, 90b, and 90c. Power supplied by PMG power source 70 is provided to EMI/OV protection circuit 86. The output of EMI/OV protection circuit 96 is diode OR'd with the power provided by backplane power buses 68 and 68' via diodes 90a, 90b, and 90c for provision to module power supply 98.

Maintenance module 76 is connected to receive power from backplane power buses 66 and 66', but not from PMG power source 70. Power received from backplane power buses 66 and 66' is OR'd via diodes 94a and 94b, respectively, to provide power to module power supply 92. In this way, maintenance module 76 is connected to receive power only from the maintenance bus that supplies power to input terminals 62a and 62a' of power supply modules 60 and 60', respectively.

Power distribution cabinet 58 provides an architecture that varies from the architecture of power distribution cabinet 38 described with respect to FIG. 2, but provides similar functionality with modules receiving power from different external sources based on the operational power requirements of each module. The main difference between the embodiments is PMG power source 70 is connected directly to some of the modules, with EMI/OV protection circuits and diode OR'ing being provided locally at the modules, rather than at the cabinet power supply modules.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A power supply module included in a power distribution cabinet of a vehicle that distributes power from a plurality of power sources to a plurality of internal cabinet modules, the power supply module comprising:
   a plurality of input terminals, each input terminal connected to a different one of the plurality of power sources, wherein availability of each of the plurality of power sources varies during operation of the vehicle; and
   a plurality of output terminals each connected to one or more of the plurality of input terminals to provide an output that represents a unique combination of selected power sources.

2. The power supply module of claim 1, wherein a first output terminal is connected to receive power only from a first input terminal.

3. The power supply module of claim 2, wherein a second output terminal is connected to receive power from a second input terminal or a third input terminal.

4. The power supply module of claim 3, wherein a third output terminal is connected to receive power from either the first input terminal, the second input terminal, or the third input terminal.

5. The power supply module of claim 4, further including:
   a switching up/down converter that is connected to receive power from either the first input terminal, the second input terminal, or the third input terminal, and to provide hold-up power to the first output terminal, the second output terminal, and the third output terminal.

6. A power distribution cabinet with a plurality of input power sources and a plurality of internal cabinet modules, wherein availability of each of the plurality of power sources varies based on an operating mode of an aircraft, the power distribution cabinet comprising:
   a power supply module having a plurality of input terminals and a plurality of output terminals, wherein each of the plurality of input terminals is connected to one of the plurality of power sources, and wherein each of the plurality of output terminals is connected to one or more of the input terminals to receive power from a unique combination of one or more of the plurality of power sources;
   a plurality of backplane power buses, each backplane bus connected to one of the plurality of output terminals to distribute power provided by the output terminal; and
   a plurality of internal cabinet modules, each module connected to receive power from one of the backplane power buses, wherein each of the plurality of modules are connected to a particular backplane bus based on power requirements of the module during various operating modes of the aircraft and power availability on the backplane bus during various operating modes of the aircraft.

7. The power distribution cabinet of claim 6, wherein a first backplane power bus is connected by the power supply module to a first input terminal to receive power from a maintenance bus that is only powered during aircraft maintenance operations.

8. The power distribution cabinet of claim 7, wherein a module with maintenance functions that requires power only during aircraft maintenance operations is connected to the first backplane power bus.

9. The power distribution cabinet of claim 7, wherein a second backplane power bus is connected by the power supply module to a second input terminal to receive power from a permanent magnet generator that only supplies power during engine operation of the aircraft.

10. The power distribution cabinet of claim 9, wherein a generator control unit (GCU) module that requires power only during engine operation of the aircraft is connected to the second backplane power bus.

11. The power distribution cabinet of claim 9, wherein the second backplane bus is further connected by the power supply module to a third input terminal to receive power from a main power bus.

12. The power distribution cabinet of claim 9, wherein a third backplane power bus is connected by the power supply module to receive power from any of the plurality of power sources connected to the plurality of input terminals.

13. The power distribution cabinet of claim 6, further including an external feeder that connects an external power source directly to one or more of the plurality of cabinet modules without connection to the power supply module.

14. The power distribution cabinet of claim 13, wherein modules connected directly to the external power source include a diode OR circuit for combining power from the external power source with power received from one of the cabinet backplane power buses.

15. The power distribution cabinet of claim 6, wherein one or more of the plurality of modules are connected to two or more cabinet backplane power buses.

* * * * *